United States Patent [19]
Ahn

[11] Patent Number: 5,716,019
[45] Date of Patent: Feb. 10, 1998

[54] VCR HAVING A REEL GEAR BRAKE DEVICE

[75] Inventor: Seong-Ick Ahn, Seoul, Rep. of Korea

[73] Assignee: Daewoo Electronics Co., Ltd., Seoul, Rep. of Korea

[21] Appl. No.: 719,422

[22] Filed: Sep. 24, 1996

[30] Foreign Application Priority Data

Sep. 30, 1995 [KR] Rep. of Korea .................. 95-33453

[51] Int. Cl.[6] .................................................. G11B 15/43
[52] U.S. Cl. ................................ 242/355.1; 242/355.2
[58] Field of Search ........................... 242/355, 355.1, 242/355.2; 360/85, 95, 96.3, 96.4, 96.5

[56] References Cited

U.S. PATENT DOCUMENTS 5,459,626  10/1995  Lee et al. .................... 360/85
5,609,310  3/1997  Kobayashi .................... 242/336

Primary Examiner—John P. Darling
Attorney, Agent, or Firm—Beveridge, DeGrandi, Weilacher & Young LLP

[57] ABSTRACT

A VCR having a reel gear brake device is formed with a friction plane along the circumferential plane of a reel gear, and a brake member arranged to be able to swing about a hinge shaft toward the friction plane by a predetermined angle. An operational spring is installed between one end of the brake member and a brake operating member, and one end of the brake member projects to extend for forming an elastic beam. A control cam eccentrically rotated at the center of the elastic beam is closely installed for minutely controlling the braking force of the brake member since the elastic force of the elastic beam is changed in accordance with the rotated positions of the control cam. Thus, the operation of the brake member is maintained in the optimum state and manufacturing cost is lowered to enhance assembling productivity while the construction is simplified.

5 Claims, 4 Drawing Sheets

VCR HAVING A REEL GEAR BRAKE DEVICE

BACKGROUND OF THE INVENTION

1. Field of the Invention

The present invention relates to a brake device of a reel gear employed to the interior of a video cassette recorder (VCR), and more particularly to a VCR having a reel gear brake device, wherein a control cam is closely attached to a brake member of a reel gear for minutely controlling a frictional force.

2. Description of the Prior Art

Generally, a VCR is installed with a single reel gear or a pair of reel gears rotating by being wound with a tape therein for guiding the travelling of the tape. The reel gear is installed with a brake device for stopping the reel gear.

Now, a structure of the conventional reel gear brake device will be described. FIG. 1 illustrates a plan view of a VCR having the conventional reel gear brake device. As shown in FIG. 1, a chassis 3 for fixing elements is installed to the interior of VCR 1. A rotatable reel gear 20 and a brake member 10 for exerting a braking force upon reel gear 20 are arranged onto chassis 3. Also, an operational spring 7 for swinging brake member 10 to attain a brake applying state and a restoring spring 9 for changing the braking state into a releasing state are connected to brake member 10.

FIG. 2 illustrates a partial enlargement view of the reel gear brake device of FIG. 1. As can be noted in FIG. 2, the reel gear brake device is formed by reel gear 20, brake member 10 and springs 7 and 9 arranged onto chassis 3.

Reel gear 20 is formed with a circular reel part 24 rotating by being wound with a tape (not shown) at the center thereof, and a friction plane 26 having a larger diameter than reel part 24 for inciting sliding friction thereon at the outer periphery.

Brake member 10 can swing about a hinge shaft 13 by as many as a predetermined angle, and a pad 17 for increasing a friction coefficient is attached to one end of brake member 10 which is closely attached to friction plane 26 by the swinging motion. Brake member 10 partially projects to form an arm 15, and operational spring 7 is fixed to an end of arm 15. Also, restoring spring 9 is fixed to brake member 10 at the corresponding side of arm 15.

One end of operational spring 7 is connected to a hooking projection 12 of arm 15, and the other end thereof is connected to an operating member 6. One end of restoring spring 9 is connected to hooking projection 12 of brake member 10, and the other end thereof is connected to a fixing element 30.

The VCR having the above-described conventional reel gear brake device is operated as below.

When brake member 10 is operated to be on from the releasing state, operating member 6 draws one end of operational spring 7. A tensile force of operational spring 7 exerts upon arm 15. By this operation, brake member 10 is rotated by centering about hinge shaft 13. By the rotation of brake member 10, pad 17 becomes in contact with friction plane 26, and the frictional force produced between pad 17 and frictional plane 26 serves as a braking force for stopping the rotation of reel gear 20. That is, brake member 10 accomplishes the brake applying state.

When brake member 10 is to be off from the braking state, operating member 6 returns to its original position to decrease the tensile force exerting upon operational spring 7. If the decreasing tensile force becomes smaller than the tensile force of restoring spring 9, brake member 10 is rotated in the backward direction because of the tensile force of restoring spring 9. Consequently, a space is provided between friction plane 26 and pad 17. In other words, reel gear 20 can be freely rotated while braking member 10 is in the releasing state.

In the VCR having the conventional reel gear braking device operated as above, however, unit cost of restoring spring 9 is expensive, hooking projection 11 is to be separately installed for fixing both ends of restoring spring 9, and fixing element 30 is employed, so that the assembling productivity is degraded. Furthermore, the elastic force of the elastic element (e.g., spring) for securing a desired braking force cannot be minutely adjusted.

SUMMARY OF THE INVENTION

The present invention is devised to solve the foregoing problems. It is an object of the present invention to provide a VCR having a reel gear brake device, wherein a restoring spring of a brake member is substituted by an elastic beam, and a control cam for minutely adjusting an elastic force of the elastic beam is installed for affording an optimum braking force.

To achieve the above object of the present invention, there is provided a VCR having a reel gear brake device comprising: a reel gear formed with a friction plane along a circumferential plane thereof; a brake member being capable of swinging about a hinge shaft at a predetermined angle, the brake member being in contact with and distanced from the friction plane according to swung positions thereof; an elastic member being connected between one end of the brake member and a brake operating member which operates the brake member, the elastic member for applying an elastic force to the brake member according to an operation of the brake operating member; an elastic beam being extended from the brake member; and a control cam being in contact with the elastic beam, the control cam being capable of eccentrically rotating, the control cam for controlling an elastic force of the elastic beam by controlling a bending amount of said elastic beam according to rotated positions thereof.

Preferably, the brake member is installed with a pad for increasing a friction force onto an area of closely attaching between the brake member and the friction plane.

In addition, the brake operating member operates the brake member so that the brake member is in contact with the friction plane, and the elastic force of the elastic beam is applied to the control cam so that the brake member is distanced from the friction plane.

It is preferable that the control cam is formed with an adjustment groove rotated positions thereof by an operation from an outside.

In the VCR having the reel gear brake device according to the present invention described as above, the operating member exerts the tensile force upon the elastic member to swing the brake member centering about the hinge shaft. By the swing motion of the brake member, the pad contacts the friction plane for applying the braking force upon the reel gear. At this time, a user manipulates a driver for changing the rotated position of the control cam to control a bending elastic force imposed upon the elastic beam. The bending elastic force of the elastic beam is transmitted to the brake member for adjusting the attaching range between the pad and friction plane.

In the VCR having the reel gear brake device according to the present invention constructed as above, the elastic force of the elastic beam is minutely adjusted to control the elastic force in the optimum state. By doing so, the optimum operation of brake member can be maintained. Also, it is effective in decreasing the number of elements and simplifying the construction.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A VCR having a reel gear brake device according to the present invention will be described in detail with reference to FIGS. 3 and 4.

Figure 1:
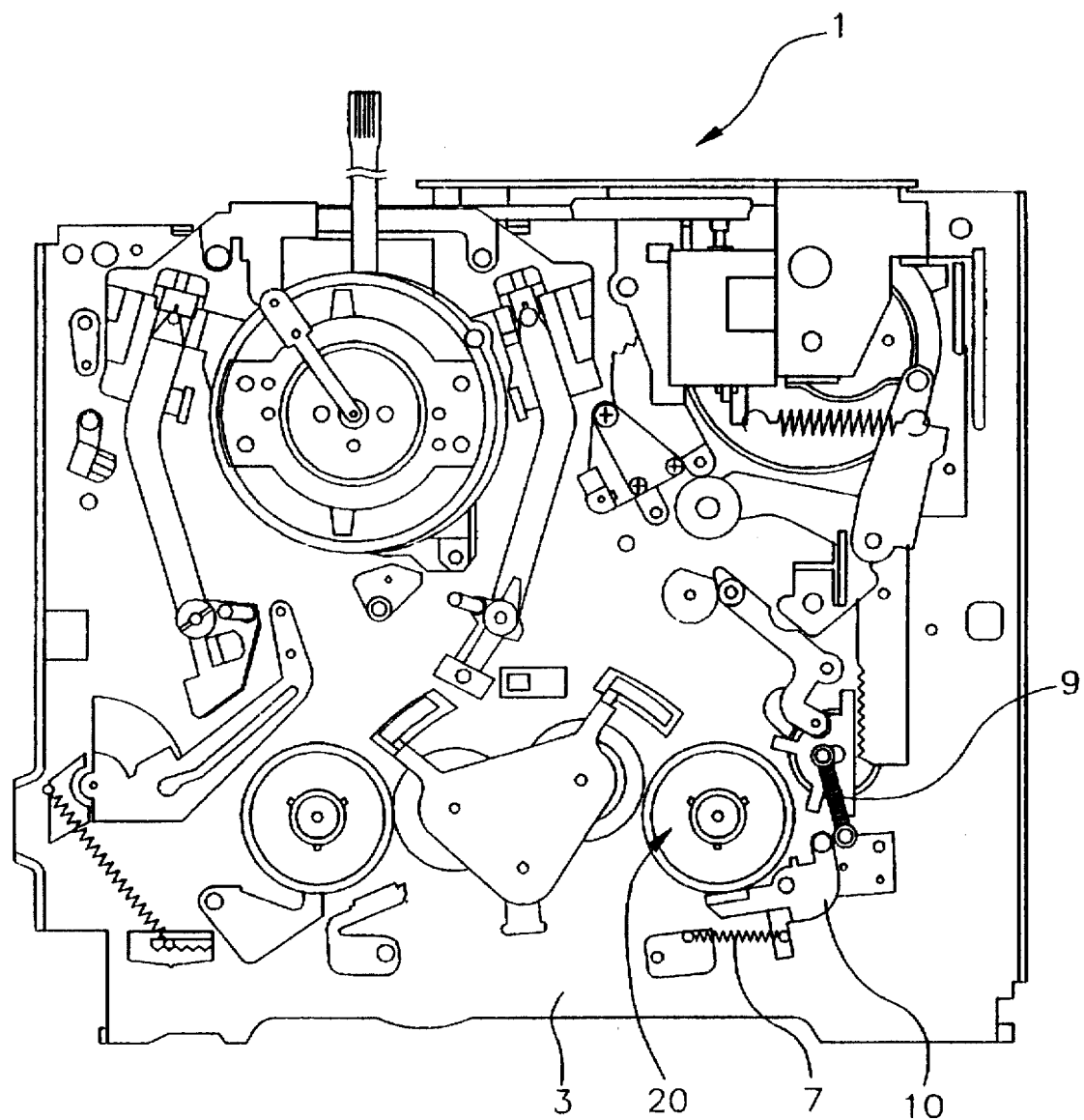
FIG. 1 is a plan view showing a VCR having a conventional reel gear brake device.
Figure 2:
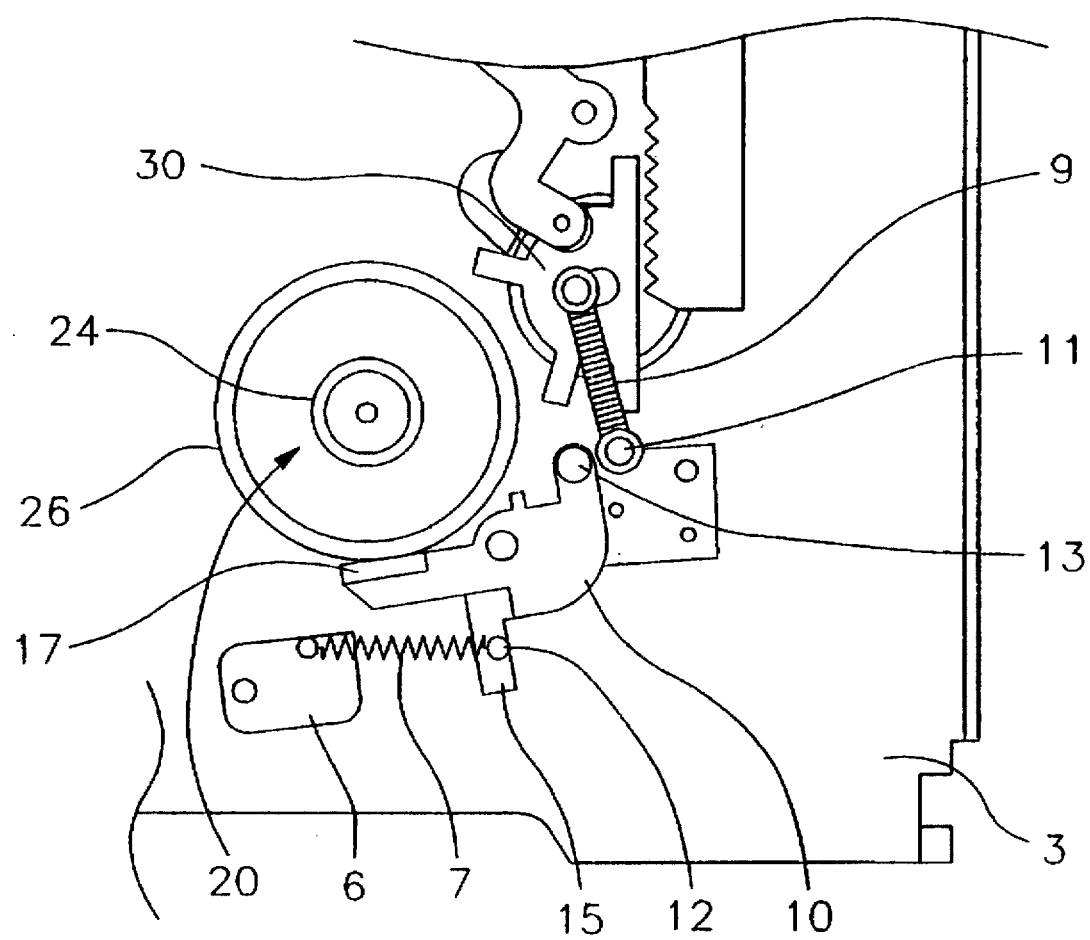
FIG. 2 is a partial enlargement view showing the reel gear brake device of FIG. 1.
Figure 3:
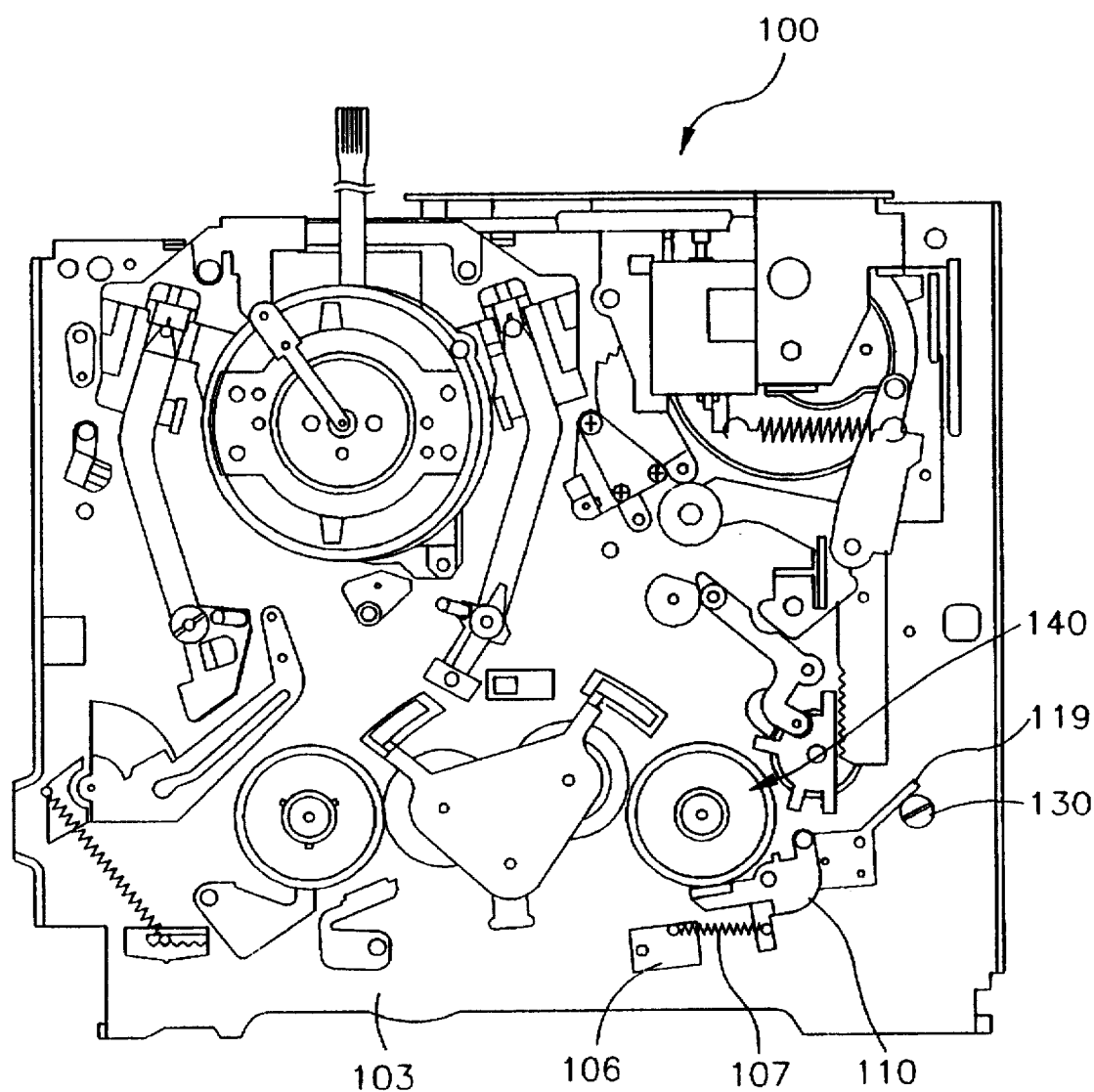
FIG. 3 is a plan view showing a VCR having a reel gear brake device according to the present invention.

FIG. 3 is a plan view showing the VCR having the reel gear brake device according to the present invention. As shown in FIG. 3, a chassis 103 is placed onto the interior of VCR 100. Also, a reel gear 140 is rotatably installed to one side of chassis 103, and a brake member 110 is installed to the adjacent area. One end of brake member 110 extends to be long for forming an elastic beam 119, and a control cam 130 is closely attached to elastic beam 119. An operational spring 107 is connected to the other side of brake member 110, and the other end of operational spring 107 is connected to an operating part 106.

Figure 4:
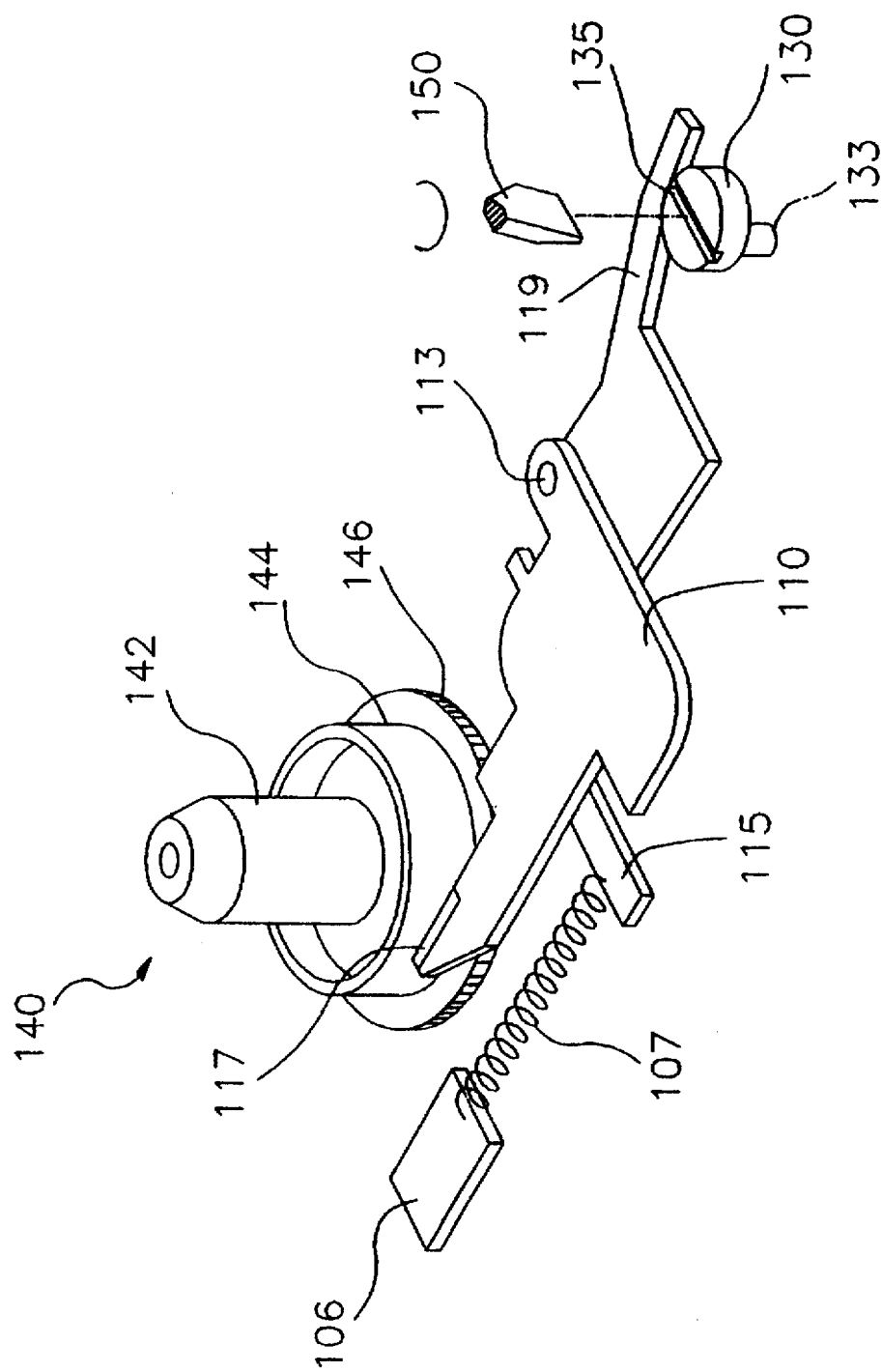
FIG. 4 is a perspective view showing the reel gear brake device according to the present invention.

FIG. 4 illustrates a perspective view of the reel gear brake device according to the present invention. As shown in FIG. 4, the reel gear brake device includes reel gear 140, brake member 110, operating part 106 and control cam 130.

Reel gear 140 has a reel portion 142 wound with a tape at the center thereof, and a friction plane 144 is formed along the circumferential plane at the periphery of reel portion 142. A gear part 146 for rotating reel gear 140 is formed to the bottom portion of friction plane 144.

Brake member 110 is attached with a pad 117 for increasing a friction coefficient onto an area for being closely attached to friction plane 144, and can swing about a hinge shaft 113 formed to a predetermined position by as many as a predetermined angle. An arm 115 extends by projecting from the central portion of pad 117 and hinge shaft 113, and operational spring 107 is connected to the end of arm 115. The other end of operational spring 107 is connected to operating portion 106 fixed to a portion spaced apart from arm 115 by a predetermined distance.

A portion of brake member 110 projects from an area in member to pad 117 centering about hinge shaft 113 to form elastic beam 119. In other words, a fixing end of elastic beam 119 is integrally formed with brake member 110, and a free end thereof is not supported. Control cam 130 is closely attached to a central area in the lengthwise direction of elastic beam 119.

Control cam 130 is closely attached to the central area of elastic beam 119, and an adjustment groove 135 shaped as a minus sign is formed in the upper surface, and a cam shaft 133 eccentrically-provided by as many as a predetermined distance is formed to the lower surface, so that overall control cam 130 is rotated with respect to chassis 103.

The VCR having the reel gear brake device according to the present invention constructed as above is operated and effected as follows.

When reel gear 140 goes to the braking state from the brake releasing state, operating part 106 is moved by the predetermined distance to exert the tensile force upon operational spring 107. Since the tensile force of operational spring 107 is imposed upon arm 115, brake member 110 swings centering about hinge shaft 113. By the swing motion of brake member 110, pad 117 is closely attached to friction plane 144 to produce the braking force. Due to this braking force, reel gear 140 is stopped finally and the brake applying state is accomplished.

If reel gear 140 is to be in the releasing state from the brake applying state, operating part 106 restores the moved distance to decrease the tensile force exerting on operational spring 107. When the tensile force becomes smaller than the elastic force of elastic beam 119, brake member 110 is rotated in the backward direction by the restoring force of elastic beam 119, and pad 117 is separated from friction plane 144. That is, reel gear 140 is in the state of being freely rotated while attaining the brake releasing state.

When the braking force of the releasing state and applying state of brake member 110 is required to be controlled, the user inserts a driver 150 into adjustment groove 135 for rotating control cam 130.

If the user rotates control cam 130 by 180° or so from 0° in the clockwise direction (designated by an arrow in FIG. 4), the distance between cam shaft 133 and elastic beam 119 is shortened. Due to this fact, the elastic force applied by elastic beam 119 upon brake member 110 is reduced to increase the braking force originated from operational spring 107.

If the user rotates control cam 130 in the foregoing state in the counter-clockwise direction (in the direction reverse to the arrow of FIG. 4) by 180° or so from 0°, the distance between cam shaft 133 and elastic beam 119 is increased. Due to this fact, the elastic force applied by elastic beam 119 upon brake member 110 is increased to reduce the braking force originated from the operational spring 107. The reason of affecting the contrary influence of operational spring 107 and elastic beam 119 upon the braking force is in that they exert the moment in the opposite direction to each other centering about hinge shaft 113.

As a result, the VCR having the reel gear brake device according to the present invention can minutely adjust the elastic force of the elastic beam. By doing so, the braking force is also minutely controllable. Additionally, the construction is simple to reduce the number of elements. Also, the metallic restoring spring can be simply substituted by a plastic mold. Therefore, the manufacturing cost is lowered and assembling productivity is enhanced while the operation of the brake member is maintained in the optimum state.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A VCR having a reel gear brake device comprising:
   a reel gear formed with a friction plane along a circumferential plane thereof;

a brake member capable of swinging about a hinge shaft at a predetermined angle, said brake member being in contact with and distanced from said friction plane according to swung positions thereof;

an elastic member connected between one end of said brake member and a brake operating member which operates said brake member, said elastic member applying an elastic force to said brake member according to an operation of said brake operating member;

an elastic beam extended from said brake member; and an eccentrically rotating control cam in contact with said elastic beam, said control cam capable of controlling an elastic force of said elastic beam by controlling a bending amount of said elastic beam according to rotated positions of said control cam.

2. A VCR having a reel gear brake device as claimed in claim 1, wherein said brake member is installed with a pad for increasing a friction force between said brake member and said friction plane.

3. A VCR having a reel gear brake device as claimed in claim 1, wherein said brake operating member operates said brake member so that said brake member is in contact with said friction plane, and the elastic force of said elastic beam is applied to said control cam so that said brake member is distanced from said friction plane.

4. A VCR having a reel gear brake device as claimed in claim 1, wherein said control cam is formed with an adjustment groove for adjusting the rotated positions thereof by an operation from an outside.

5. A VCR having a reel gear brake device comprising:

a reel gear formed with a friction plane along a circumferential plane thereof;

a brake member capable of swinging about a hinge shaft at a predetermined angle, said brake member in contact with and distanced from said friction plane according to swung positions thereof;

a pad for increasing a friction force between said brake member and said friction plane;

a spring connected between one end of said brake member and a brake operating member which operates said brake member, said spring applying an elastic force to said brake member according to an operation of said brake operating member so that said brake member is in contact with said friction plane;

an elastic beam extended from said brake member; and an eccentrically rotating control cam in contact with said elastic beam, said control cam controlling an elastic force of said elastic beam by controlling a bending amount of said elastic beam according to rotated positions thereof, said control cam being formed with an adjustment groove for adjusting the rotated positions thereof by an operation from an outside.

* * * * *